Patented Oct. 31, 1939

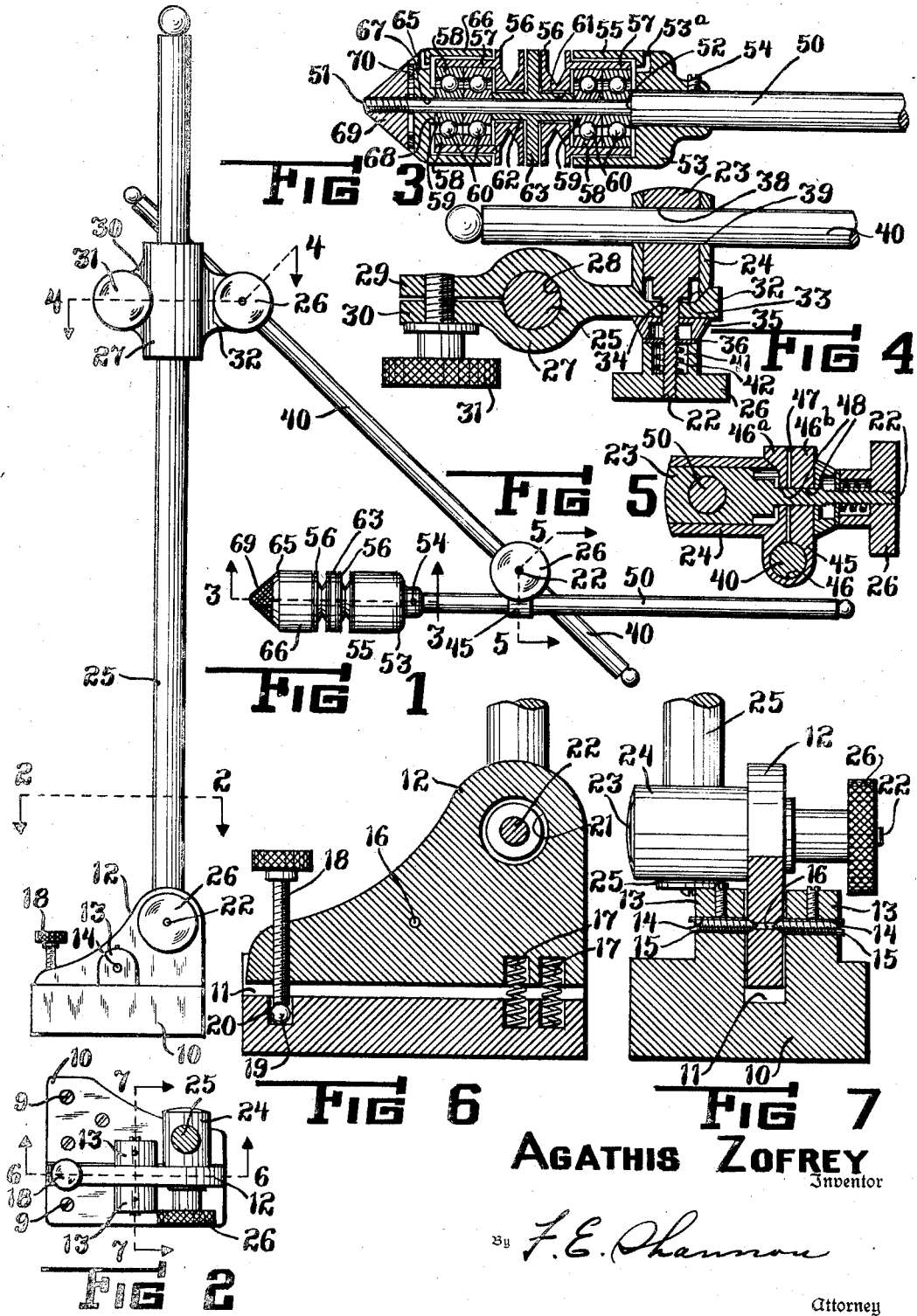

2,177,921

UNITED STATES PATENT OFFICE 2,177,921

IDLER

Agathis Zofrey, Akron, Ohio

Application October 15, 1937, Serial No. 169,182

8 Claims. (Cl. 74—242.8)

This invention relates to improvements in idlers for driving belts and while intended for use generally wherever it may be advantageously employed, the invention is particularly adapted for use in connection with a jeweler's lathe to support, properly position and operate the flexible driving element for operating the various attachments for such lathes.

Objects of the invention are to provide a belt idler of strong, durable construction which may be economically manufactured and which may be quickly and conveniently adjusted to operate in any position with a minimum of friction.

Other objects are to provide an idler attachment for jeweler's lathes or other belt driven device, having a mounting consisting of a plurality of members universally and adjustably connected in end to end relation to permit adjustment to any desired working position; to provide an improved base for said members including means operable to accurately move the supporting members to bring the work into operative contact with the main lathe, shaft or tools or other devices operatively mounted therein and to provide improved means for locking said supporting members in a fixed position.

The above objects are accomplished and additional advantages attained by the novel construction, combination and arrangement of parts hereinafter described with reference to the accompanying drawing in which there is shown an illustrative embodiment of the invention, it being understood that changes and modifications may be made which come within the scope of the claims hereunto appended.

In the drawing:

Figure 1 is a side elevational view of an idler constructed in accordance with this invention, Figure 2 is a horizontal, sectional view taken as indicated by the lines 2—2 of Figure 1 and showing in plan, the base portion of my improved device, Figure 3 is a longitudinal, sectional view taken as indicated by the lines 3—3 of Figure 1, Figure 4 is a similar view taken as indicated by the lines 4—4 of Figure 1, Figure 5 is a sectional view taken as indicated by the lines 5—5 of Figure 1, Figure 6 is a vertical, sectional view taken as indicated by the lines 6—6 of Figure 2, Figure 7 is a cross sectional view taken as indicated by the lines 7—7 of Figure 2.

Proceeding now to a detailed description of the invention with reference to the particular adaptation thereof illustrated in the drawing, the numeral 10 denotes a mounting member which is in the form of a block adapted to be secured to a lathe bed or other structure by the screws 9 or any suitable fastening means. The block 10 is provided on the upper face thereof with a channel 11 which forms a seat for receiving the lower portion of the base member 12.

The numeral 13 denotes suitable lugs, one of which projects upwardly from the block 10 on each side of the channel 11. The lugs 13 are provided with axially alined, threaded bores 14 in each of which is mounted a pivot screw 15. The inwardly presented end of each screw 15 is conical and is seated in a conical end portion of the bore 16 which extends horizontally through the member 12. The member 12 is thus pivotally secured to the block 10 with the lower edge thereof in spaced relation to the bottom of the groove 11.

The numeral 17 denotes coil springs which are operatively mounted between the block 10 and the member 12 adjacent one end thereof for normally urging and holding the member 12 in one extreme position in the groove 11.

The numeral 18 denotes a screw bolt which is mounted in a suitable threaded bore which is formed in the block 12 in the end portion thereof opposite the spring 17 and which bears against the ball 19 mounted in a suitable seat 20 in the base 10 whereby the screw 18 may be operated to move the block 12 on the pivots 15 against the spring 17.

The base member 12 is provided adjacent one end thereof with a horizontal bore 21 in which is mounted a bolt having a cylindrical head 23 on which is mounted a sleeve 24. The sleeve 24 and head 23 are provided with alined bores for receiving the rod 25 which is slidably mounted therein and arranged to be adjustably held in locked position by operating the headed nut 26 as hereinafter specifically described.

The numeral 27 denotes a clamping member which is provided with a bore 28 in which the rod 25 is received. The member 27 is extended on one side thereof and cut vertically to provide clamping ears 29 and 30.

A screw bolt 31 is entered in a suitable bore in the ear 30 and in a coinciding threaded bore in the ear 29 whereby the screw 31 may be operated to securely clamp the members 27 on the rod 25. An ear 32 projects from the member 27 on the side diametrically opposite the ears 29 and 30. The ear 32 is provided on one side thereof with a conical seat 33 and has a bore 34 which extends through the ear 32 and is positioned centrally of said seat. A bolt 22 having a cylindrical head 23 is entered in the bore 34 from the seat side thereof and a cylindrical sleeve 24 is mounted on said head. The sleeve 24 has a conical face fitting in the seat 23. The head 23 is provided with a bore 38 which extends diametrically therethrough and the sleeve 24 with a similar bore 39 which may be brought into axial alinement with the bore 38. A rod 40 is positioned through the bores 38 and 39 and a threaded nut is operatively positioned on the bolt 22 with the washer members 35 and 36 positioned between the nut and the ear 32. The nut 26 may be provided with an axial seat 41 for receiving the spring 42 which is mounted on the bolt 22 and pressed between the washer 36 and the nut 26 to maintain the same in an operative position thereon.

The nut 26 may be loosened on the bolt 22 to bring the bores 38 and 39 into axial alinement whereupon the rod 40 can be moved longitudinally in said bore to any desired position and the nut 26 tightened to securely clamp the rod 40 in a fixed position. As the nut 26 is tightened, the edge of the sleeve 24 is brought into forced contact with the seat 33 to frictionally hold the same from turning movement thereon.

A similar clamping member 45 is provided with a bore 46 in which is received the rod 40. The member 45 is provided with a cut 47 which extends from the bore 46 to the opposite edge thereof, thus forming two spaced ears 46a and 46b which are provided with axially alined bores 48 through which a bolt 22 is entered and held in position therein by a nut 26. The bolt 22 on the member 45 is likewise provided with a cylindrical head 23 and a sleeve 24 in which is positioned a rod 50 which is adjustably held in position thereon by operating the screw bolt 26 as hereinbefore specified in the description of the member 32. The outwardly presented end portion 51 of the shaft 50 is reduced in diameter, thus forming an annular shoulder 52.

The numeral 53 denotes an end member having a bore 55 in which the rod 50 is received. The end member 53 is fixed on the shaft 50 by the set screw 52 or otherwise suitably secured thereto. The member 53 is provided with an axially arranged cylindrical shell 55 which projects over the reduced portion 51. The numeral 56 denotes a sheave which is provided with a relatively large hollow hub 57 which projects into the shell 55. Suitable anti-friction bearings are positioned in the hub 57 to operatively position the hub on the reduced portion 51.

In the drawing, the hub 57 is provided with two ball bearings, each consisting of an integrally grooved outer ring 68, an externally grooved base ring 58 concentrically positioned therein with a circumferentially arranged series of balls 60 positioned therebetween. The outer rings 59 are pressed or otherwise fixed in the hub 57 and the inner rings 59 are mounted on the portion 51 of the shaft 50 with one of the base rings bearing against the shoulder 52. The main body of the sheave 56 is provided with a relatively large axial opening 61 and a tube 62 is mounted on the reduced end portion 51 and is positioned through said opening to bear against one of the axial ends of one of the base rings 59.

A like sheave 56 which is likewise provided with a hub 57 and anti-friction bearing members 58, 59 and 60 is reversibly positioned on the reduced portion 51 of the shaft 50 with a base ring 58 bearing against the outer end of the tube 62.

The sheaves 56 are spaced apart and the tube 62 is provided with a disk 63 which is positioned between the sheaves 56 in close spaced relation to the adjacent axial faces thereof. The numeral 65 denotes an outer member having an axial bore 67 in which the reduced portion 51 is received. The member 65 is provided with an inwardly projecting, cylindrical shell 66 which projects over the outwardly presented hub 57 and terminates in close spaced relation to the outwardly positioned sheave 56. The member 65 is provided on the inwardly presented face thereof with an axial boss 68 which bears against a base ring 58 of the outwardly positioned bearing and a nut 69 is threaded on the outer end portion of the shaft 51, a suitable lock washer 70 being positioned therebetween.

While the improved idler herein described may be used in any position for different purposes in any kind of device to which it may be applied, it is particularly convenient when used as an attachment for a jeweler's lathe and when so used may be applied in various ways to accomplish different work. The block 10 may be secured to the lathe bed by the screws or bolts 9 or may be suitably attached to any adjacent part or structure. The rod 25 may be swung on the bolt 22 and turned or moved longitudinally in the bore 38 in the bolt 22, mounted on the base member 12, whereupon the nut 26 may be locked from turning, swinging or sliding movement on the member 12. The clamping member 27 may be moved longitudinally on the rod 25 and rotated thereon to any desired position where it may be locked by operating the bolt 31. The rod 40 can likewise be moved longitudinally and rotated in the bore in the head 23 on the ear 32 and swung on said ear to any desired position where it can be locked in a relatively fixed position by operating the nut 26. The member 45 may be rotated on the rod 40 and moved longitudinally to any desired position thereon and the rod 50 rotated or moved longitudinally in the bore 46 whereupon the nut 26 can be operated to hold the said parts in a relatively fixed position. It will thus be seen that the rods 25, 40 and 50 can be moved to place the sheaves 56 in any desired operative position on practically any type of lathe or other machine on which it can be employed.

The screw bolt 18 can be operated to move the base member 12 whereupon all of the parts mounted on said base member and particularly the sheaves 56 will move therewith.

While I have shown particular means for imparting a limited rotary movement to the base member 12 on the block 10, it is to be understood that any suitable means may be employed for accomplishing this purpose.

Having thus illustrated my invention and described the same in detail, what I claim as new and desire to secure by Letters Patent is:

1. In an idler of the character described, an idler shaft; an idler mounted on said shaft, said idler including a pair of sheaves; each sheave provided on one axial side thereof with a concentrically arranged, cylindrical barrel; anti-friction bearings fixed in the barrel of each sheave, said bearings mounted on said shaft with the sheaves oppositely positioned thereon and contacting only with the bearings on which it is mounted, a sleeve at each end of said idler, each sleeve covering one of said barrels and means for holding said bearings from longitudinal movement on said shaft.

2. In an idler of the character described, an idler shaft; an idler mounted on said shaft, said idler including a pair of sheaves; each sheave provided on one axial side thereof with a concentrically arranged, cylindrical barrel; anti-friction bearings fixed in the barrel of each sheave, said bearings mounted on said shaft with the sheaves oppositely positioned thereon and contacting only with the bearings on which it is mounted, a sleeve at each end of said idler, each sleeve covering one of said barrels, means for holding said bearings from outward, longitudinal movement on said shaft; a tube positioned on said shaft between said bearings to hold said sheaves in spaced relation and a disk on said tube, said disk positioned between said sheaves in spaced relation thereto.

3. In an idler of the character described, an idler shaft; an idler mounted on said shaft; said idler including a pair of sheaves; each sheave provided on one axial side thereof with a concentrically arranged, cylindrical barrel; anti-friction bearings fixed in the barrel of each sheave, said bearings mounted on said shaft with the sheaves oppositely positioned thereon and contacting only with the bearings on which it is mounted and a sleeve at each end of said idler, each sleeve projecting over one of said barrels in spaced relation thereto.

4. In an idler of the character described, an idler shaft, an idler mounted on said shaft, said idler comprising two end members, each having an inwardly projecting, cylindrical shell, two sheaves mounted in spaced relation on said shaft, each sheave provided with an axially projecting barrel which projects into the shell on the adjacent end member without contact therewith; a plurality of anti-friction bearings fixed in each barrel and means rotatably mounted on said shaft for holding said sheaves and bearings from inward longitudinal movement on said shaft.

5. In an idler of the character described, an idler shaft; an idler mounted on said shaft, said idler comprising two end members; two sheaves mounted in spaced relation on said shaft between said end members, each sheave provided with an axially projecting barrel; a plurality of anti-friction bearings mounted in each barrel to support said idlers on said shaft and means mounted on said shaft between said bearings for holding said sheaves and bearings from inward longitudinal movement on said shaft.

6. An idler head comprising a shaft having a shoulder, a reduced end portion projecting from said shoulder, an end member secured to said shaft adjacent said shoulder, a shell on said end member, said shell projecting over said reduced end portion; a second end member on the outwardly projecting end of said reduced portion, said second end member having an inwardly projecting shell; two pulleys mounted in spaced relation on said reduced portion, each pulley provided with a bore having a diameter substantially larger than the diameter of said shaft, each pulley having an axially projecting barrel projecting into the shell on the adjacent end member, anti-friction bearings supporting said barrels on said shaft and a spacer member including a tube mounted on said shaft and extending into the bores in said pulleys and engaging said bearings and a disk mounted on said tube and positioned between said pulleys in spaced relation thereto.

7. An idler head comprising a shaft having a shoulder, a reduced end portion projecting from said shoulder, an end member secured to said shaft adjacent said shoulder, a shell on said end member, said shell projecting over said reduced end portion; a second end member on the outwardly projecting end of said reduced portion, said second end member having an inwardly projecting shell; two pulleys mounted in spaced relation on said reduced portion, each pulley having an axially projecting barrel extending into the shell on the adjacent end member in close spaced relation thereto, anti-friction bearings supporting said barrels on said shafts and a spacer member including a tube mounted on said shaft and engaging said bearings.

8. An idler head comprising a shaft, two end members fixedly secured in spaced relation on said shaft, a shell on each end member, said end members having an inwardly projecting shell, two pulleys mounted in spaced relation on said shaft, each pulley having a relatively large, axial bore; a concentrically arranged barrel projecting axially from each pulley, each barrel extending into the shell on the adjacent end member, anti-friction bearings supporting said barrels on said shafts, means holding said bearings from outward movement on said shaft; a spacer member including a tube mounted on said shaft and extending into the bores in said pulleys and engaging said bearings to limit the inward movement thereof and a disk mounted on said tube and positioned between said pulleys in spaced relation thereto.

AGATHIS ZOFREY.